(12) United States Patent
Lynch

(10) Patent No.: US 7,529,692 B1
(45) Date of Patent: May 5, 2009

(54) METHOD FOR PRESENTING RELATED ITEMS FOR AUCTION

(75) Inventor: Gerard Alan Lynch, Agoura Hills, CA (US)

(73) Assignee: AuctionHelper, Inc., Thousand Oaks, CA (US)

( * ) Notice: Subject to any disclaimer, the term of this patent is extended or adjusted under 35 U.S.C. 154(b) by 0 days.

(21) Appl. No.: 10/010,993

(22) Filed: Nov. 12, 2001

Related U.S. Application Data

(63) Continuation-in-part of application No. 09/728,356, filed on Dec. 1, 2000, now Pat. No. 7,296,033.

(51) Int. Cl.
*G06F 17/30* (2006.01)

(52) U.S. Cl. .......................... 705/27; 705/26

(58) Field of Classification Search ............. 705/26–27, 705/35, 37; 345/838, 823, 848; 715/962; *G06F 17/60, G06F 3/00*
See application file for complete search history.

(56) References Cited

U.S. PATENT DOCUMENTS

| | | | | |
|---|---|---|---|---|
| 3,604,850 | A | 9/1971 | Eckenbrecht et al. | 348/101 |
| 3,751,593 | A | 8/1973 | Rychlewski et al. | 348/100 |
| 4,418,995 | A * | 12/1983 | Mulfeld | 352/129 |
| 4,769,796 | A | 9/1988 | Levine | |
| 4,949,193 | A | 8/1990 | Kiesel | 386/52 |
| 5,695,346 | A * | 12/1997 | Sekiguchi et al. | 434/365 |
| 5,726,687 | A * | 3/1998 | Belfiore et al. | 715/785 |
| 5,745,109 | A | 4/1998 | Nakano et al. | 345/838 |
| 5,794,207 | A | 8/1998 | Walker et al. | 705/23 |
| 5,799,157 | A | 8/1998 | Escallon | 705/27 |
| 5,835,896 | A | 11/1998 | Fisher et al. | 705/37 |
| 5,890,138 | A | 3/1999 | Godin et al. | 705/26 |
| 5,902,352 | A | 5/1999 | Chou et al. | |
| 6,005,534 | A * | 12/1999 | Hylin et al. | 345/2.1 |
| 6,006,201 | A | 12/1999 | Berent et al. | |

(Continued)

FOREIGN PATENT DOCUMENTS

JP    60093570 A    5/1985

(Continued)

OTHER PUBLICATIONS

Unknown, Vendio Gallery: Works with any sales management provider, from Vendio Smart Services for Smart Sellers, web pages copyrighted 1998-2004.*

(Continued)

*Primary Examiner*—Mark Fadok
(74) *Attorney, Agent, or Firm*—IPxLaw Group LLP

(57) ABSTRACT

A method of delivering a plurality of selectable auction items to a browser of a client computer system. The client computer system downloads a main program that is configured to load onto the client computer system one or more modules including a picture displaying module. The picture displaying module obtains, from an auxiliary site, a set of picture pointers to pictures that correspond to auction items listed on a computerized auction site. The picture displaying module obtains the pictures pointed to by the picture pointers and displays the pictures of the items in a moving display on the client computer system. A selection device controls the speed of the moving display and permits the client to select a picture, thereby taking the client computer system to the item description document at the computerized auction system.

9 Claims, 9 Drawing Sheets

U.S. PATENT DOCUMENTS

| | | | |
|---|---|---|---|
| 6,058,417 A * | 5/2000 | Hess et al. | 709/219 |
| 6,085,176 A | 7/2000 | Woolston | |
| 6,157,410 A | 12/2000 | Izumi et al. | 348/445 |
| 6,161,099 A | 12/2000 | Harrington et al. | |
| 6,236,330 B1 * | 5/2001 | Cohen | 340/691.6 |
| 6,240,396 B1 | 5/2001 | Walker et al. | 705/26 |
| 6,243,691 B1 | 6/2001 | Fisher et al. | |
| 6,292,188 B1 | 9/2001 | Carlson et al. | 345/854 |
| 6,341,353 B1 | 1/2002 | Herman et al. | 713/201 |
| 6,523,037 B1 | 2/2002 | Monahan et al. | 707/10 |
| 6,405,175 B1 | 6/2002 | Ng | 705/14 |
| 6,415,320 B1 | 7/2002 | Hess et al. | 709/219 |
| 6,427,140 B1 | 7/2002 | Ginter et al. | 705/80 |
| 6,473,401 B1 | 10/2002 | Kong et al. | 370/229 |
| 6,496,857 B1 * | 12/2002 | Dustin et al. | 709/219 |
| 6,587,831 B1 | 7/2003 | O'Brien | |
| 6,636,219 B2 | 10/2003 | Merrick et al. | 345/473 |
| 6,714,960 B1 | 3/2004 | Bitar et al. | |
| 6,732,161 B1 | 5/2004 | Hess et al. | |
| 6,785,660 B1 | 8/2004 | Fedor et al. | |
| 7,047,210 B1 | 5/2006 | Srinivasan | |
| 2001/0039524 A1 | 11/2001 | Harrison, Jr. et al. | |
| 2002/0077930 A1 * | 6/2002 | Trubey et al. | 705/26 |
| 2002/0143634 A1 | 10/2002 | Kumar et al. | 705/18 |
| 2002/0188551 A1 | 12/2002 | Grove et al. | |
| 2003/0058457 A1 * | 3/2003 | Fredlund et al. | 358/1.2 |
| 2003/0093355 A1 | 5/2003 | Issa | |
| 2006/0242056 A1 | 10/2006 | Walker et al. | |

FOREIGN PATENT DOCUMENTS

| | | | |
|---|---|---|---|
| JP | 01100591 A | | 4/1989 |
| JP | 05210085 A | | 8/1993 |
| JP | 11288253 A | | 10/1999 |
| SE | 9601603 | * | 4/1996 |

OTHER PUBLICATIONS

Auctiva1, "Auctiva showcase rapidly captures significant market share with one million listings in forty six days", Business Wire, Dec. 13, 2000.*

Auctiva2, "Auctiva launches flagship service with auctiva Showcase", Auctiva News, Oct. 5, 2000.*

Auctiva3, http://web.archive.org/web/20010607125055/auctiva.com/products/showcase.asp, dated Jun. 7, 2001.*

Auctiva4, Mike Cleary. "Auction service providers bid to line up sellers", Inter@ctive Week, dated Sep. 26, 2000.*

Auctiva5, http://web.archive.org/web/20000707014738/www.auctiva.com/software.asp, dated Jul. 7, 2000.*

The Hindu, "Conversation maps", Chennai, Oct. 4, 2001.*

Unknown, Car auction reaches into space, *Automotive News*, Nov. 25, 1991, p. 6 (from Dialog File 16).

Unknown, California computer auctions no boon for bargain hunter, *San Jose Mercury News*, Sep. 13, 1993 (From Dialog File 609).

From Dialog® File 610, Onsale: Onsale brings thrill of auctions and bargain hunting online: unique Internet retail service debuts with week-long charity auction for the computer museum in Boston, *Business Wire*, May 22, 1995.

Auctiva Showcase, Oct. 2005, "Power Solutions for Online Sellers: Help: Showcase Frequently Asked Questions (FAQ)," Auctiva.com.

Charles, Oct. 2000, "Power Solutions for Online Sellers: Auctiva Launches Flagship Service with Auctiva Showcase," Auctiva.com.

Office Action from U.S. Appl. No. 11/533,045 dated Sep. 12, 2008.

Parsley, May 1999, "Lot21 Has Done it Again!", Lot21 Interactive Advertising, Findwealth.com.

Steiner, Apr. 2004, "Vendio Announces New Merchandising Tool and Positive Financials," AuctionBytes.com.

* cited by examiner

METHOD FOR PRESENTING RELATED ITEMS FOR AUCTION

CROSS-REFERENCE TO RELATED APPLICATIONS

This application is a continuation-in-part to and claims the benefit of the filing date of related U.S. application Entitled "SYSTEM AND METHOD FOR AUTOMATING LISTING AND RE-LISTING OF AUCTION ITEMS", filed on Dec. 1, 2000, Ser. No. 09/728,356, which application is incorporated by reference into the present application. This application is also related to provisional U.S. application entitled "METHOD AND APPARATUS FOR CALENDAR LISTING OF AUCTION ITEMS" filed Feb. 1, 2001, Ser. No. 60/265,946, which is incorporated by reference into the present application.

FIELD OF THE INVENTION

This invention relates generally to a method of assisting a computerized auction system and more particularly to a method of presenting seller-related items from the computerized auction system to a potential bidder.

DESCRIPTION OF THE RELATED ART

Current computerized auction systems have thousands or even tens of thousands of items for auction during a particular time interval. A potential bidder that accesses the computerized auction system is faced with a daunting task if that potential bidder wants to have easy access to items up for auction that are related to a particular seller. The potential bidder can use the auction system's search engine to search for either a particular item, a particular category or a particular seller. However, in the case of a search for a particular seller, a potentially large list of items is presented in a search results page and the selection of any one of these items takes the potential bidder to an item description and picture document from which the potential bidder must leave to select from the search results page another item of the same seller. This back-and-forth process among different documents at the computerized auction system is cumbersome and not conducive to presenting the particular auctions in a way that induces bidding on several items of the same seller. Furthermore, if the potential bidder wishes to restrict the search of a seller's items available for auction to a particular category of item offered by the seller, the task is even more cumbersome with the computerized auction system's search engine because seller-related items returned by the search engine are not categorized.

The difficulty of these processes reflects the underlying fact that the computerized auction system is simply not seller-oriented. The system tends to be egalitarian, presenting items from as many sellers as possible, when category searches are performed. Searching for categories of items for a particular seller is not the focus of the computerized auction system's presentation of items.

Therefore, there is a need for a method of assisting the user of the computerized auction system to more easily find items that are available from a particular seller and to make possible the finding of items for a particular seller in a particular category. There is also a need to present the results of the search in a way that increases the likelihood that the potential bidder will actually bid on more than one item of a sought-for seller so that the seller can benefit from offering auctions for related items.

BRIEF SUMMARY OF THE INVENTION

The present invention is directed towards such a need. A method in accordance with the present invention includes a method of delivering, in the form of selectable images, a plurality of auction items of a selected seller to a browser of a client computer system. The method includes the steps of receiving, at an auxiliary server, a request from client browser for a main program, and delivering the main program to the requesting client browser, the main program being configured to receive seller specific information, and to load and activate one or more modules including a picture displaying module for displaying selectable images. The picture displaying module is configured to moveably display, on the client browser, a set of pictures based on the seller specific information, to receive a user selection of a picture being displayed and to redirect the client browser to an auction item document at an auction site associated with the selected image.

One advantage of the present invention is that the client does not have to repeatedly jump back and forth from a search results page to a item description page at computerized auction system to view items of a specified seller.

Another advantage is that many items of a specified seller are displayed in a moving display at the client computer system so that many items are observable by the client without use of the selection device (e.g., mouse) at the client computer system and the search engine of the auction system to find the items.

Yet another advantage is that items in the moving display of items are selectable, the selection taking the client to an item description document on the computerized auction system. The moving display of items is then redisplayed on the item description document to facilitate additional selections of items.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE INVENTION

Figure 1:
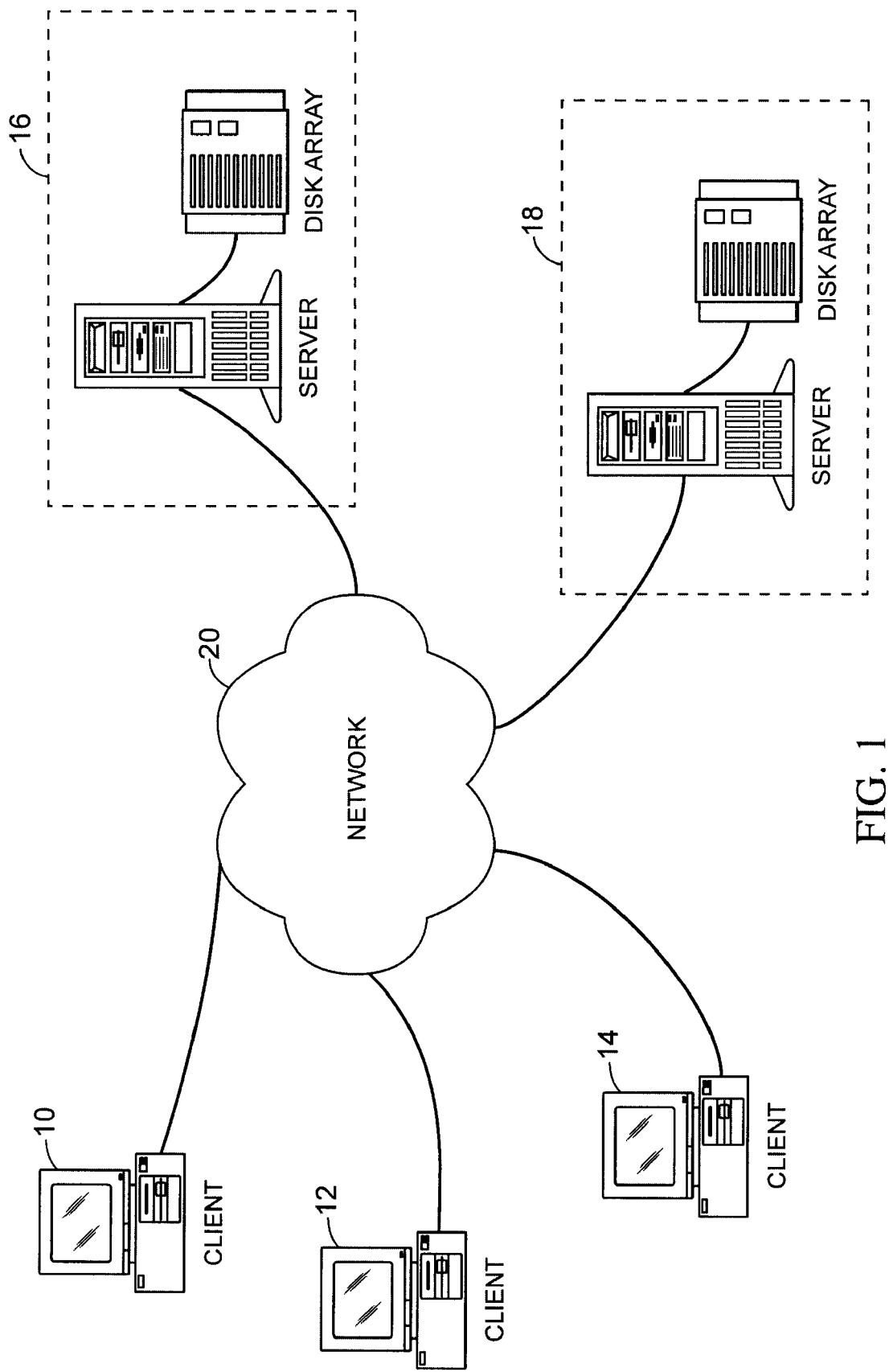
FIG. 1 shows a typical system setting in which the present invention operates.

FIG. 1 shows a typical system setting in which the present invention operates. The system includes one or more client computer systems 10, 12, 14, a computerized auction computer system 16, and an auxiliary server system 18. These systems are interconnected by a network 20, preferably the Internet or other public network, though the system setting is not limited to such networks. The network 20 permits the client computer systems 10, 12, 14 to access the computerized auction system 16 as well as the auxiliary system 18. It also permits the auxiliary system to access the computerized auction system.

Figure 2:
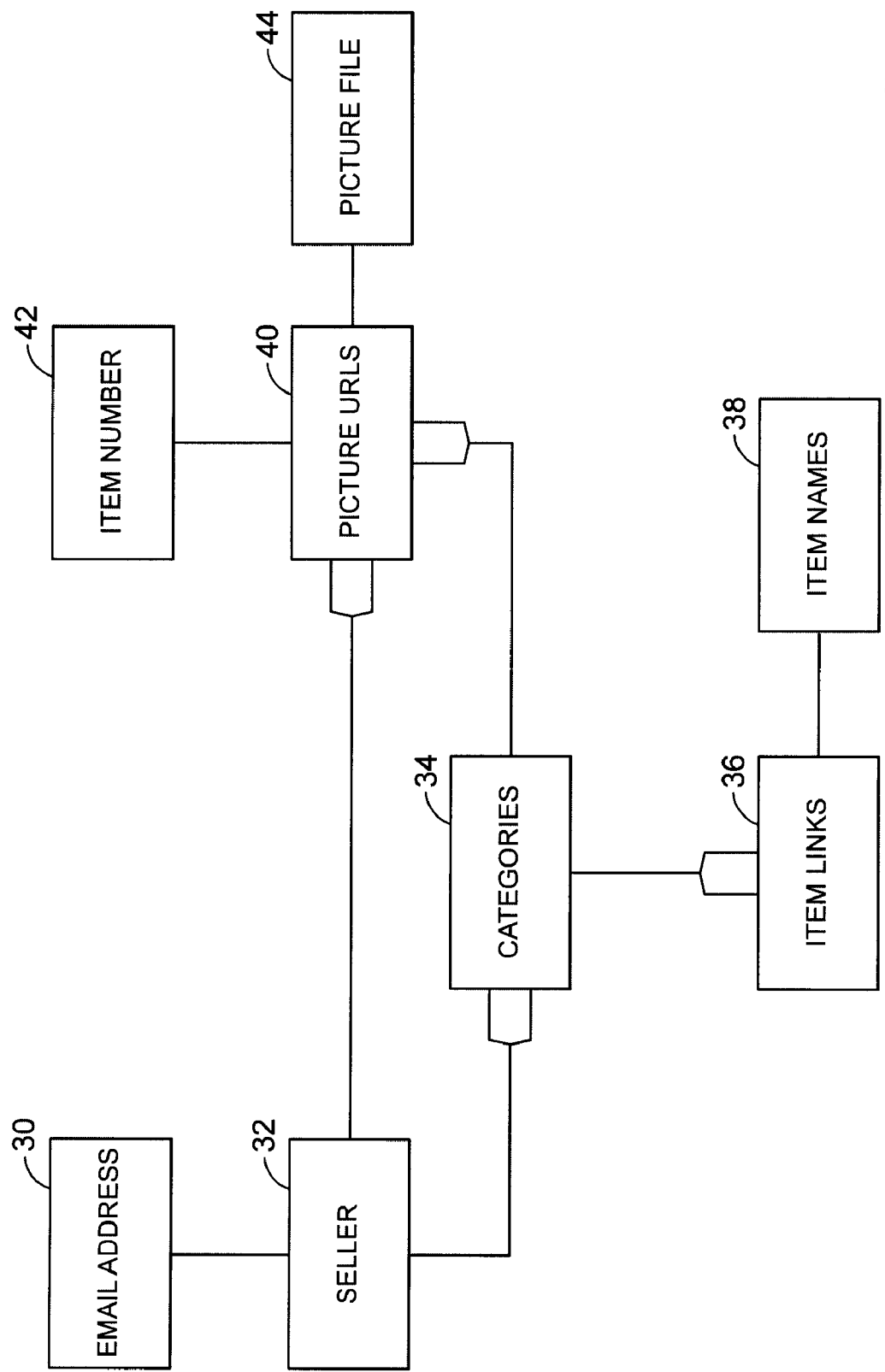
FIG. 2 shows the database entities used by the present invention.

FIG. 2 shows the database entities involved in the present invention. These database entities include Email Address 30, Seller 32, Categories 34, Item Links 36, Item Names 38, Picture Urls 40, Item Number 42, and Picture File 44.

The Email Address entity 30 has a one-to-one relationship with the Seller entity 32 thereby permitting a seller to be specified by an email address.

The Seller entity 32 has a one-to-many relationship with the Categories entity 34. A particular seller may have one or more categories for items available to be sold by auction by the seller.

The Categories entity 34 has a one-to-many relationship with the Item Links 36 entity. A particular category of a particular seller may have one or more item links.

The Item Links entity 36 has a many-to-one relationship with the Categories entity 34 and a one-to-one relationship with the Item Names entity 38.

The Picture Urls (uniform resource locator) entity 40 has either a many-to-one relationship with the Categories entity 34 or the Seller entity 32. Thus, specifying a particular seller may determine a set of Picture Urls or specifying a seller and a category may determine a set of Picture Urls; either possibility is contemplated in the present invention. The Picture Url entity 40 has a one-to-one relationship with a Picture File 44 which is accessible over the network, according to the specified url. The Picture File 44 contains a picture of an auction item. A Picture File 44, such as a JPEG or GIF file, can reside on the auxiliary server 18, the computerized auction system 16 or any other system connected to the network. There is a one-to-one relationship between a Picture Url entity 40 and an Item Number 42, which uniquely identifies the thing listed for auction at the computerized auction system.

The Seller 32, Categories 34, Picture Urls 40, Item Links 36, Item Names 38 and Item Numbers 42 entities are preferably stored together on the auxiliary server system, but could be separately stored on one or more different servers accessible via the network.

Figure 3:
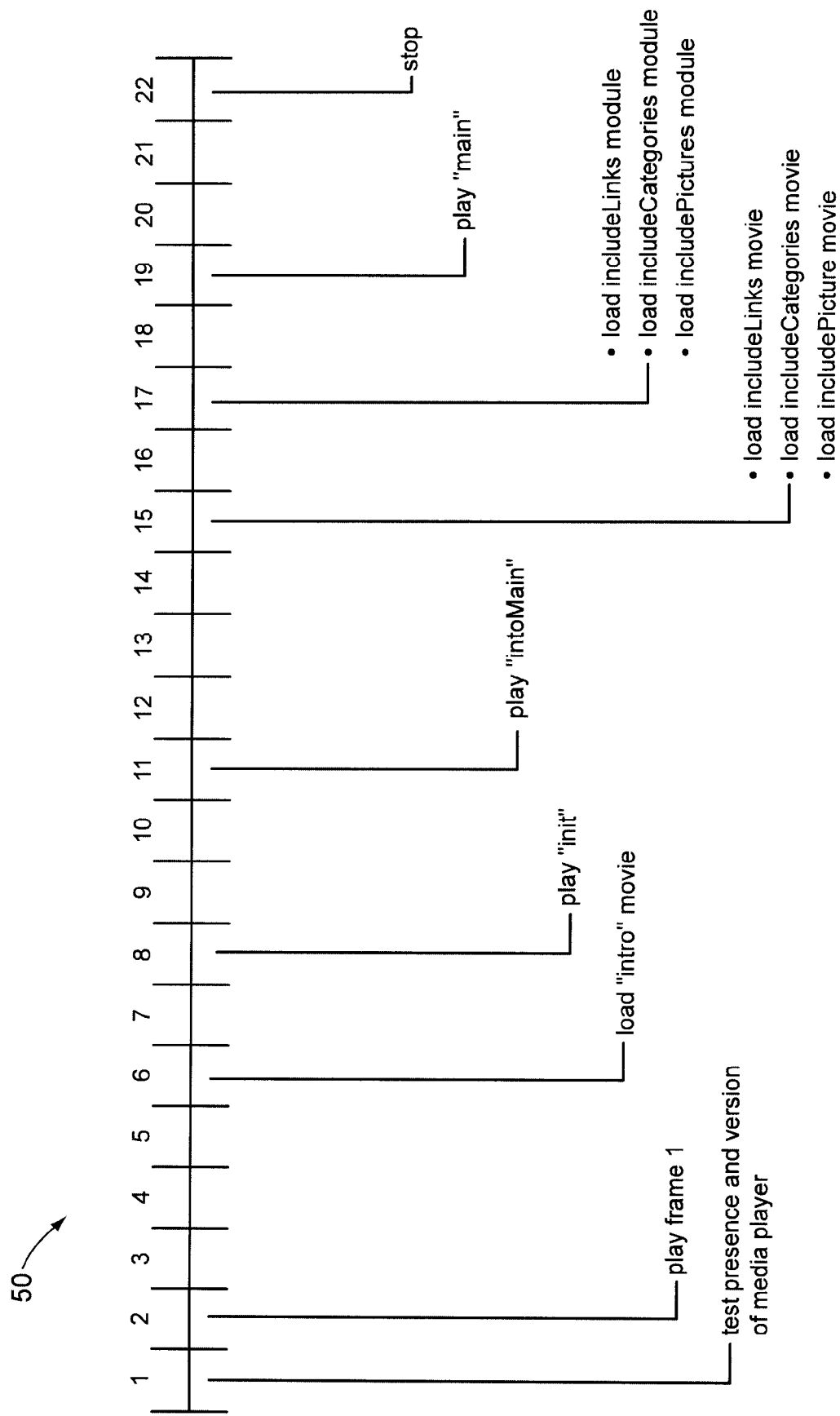
FIG. 3 sets forth a representative timeline for the main program of the present invention.

FIG. 3 sets forth a typical timeline 50 for the main program of the present invention.

Upon the loading of frame 1, a test is made to determine whether a required version of the media player is present. The Flash 5 Media Player from Macromedia is preferred for the present invention. At frames 6, 8 and 11 introduction movies are started. At frame 15, movies for each of the modules, includeCategories, includeLinks, and includePictures, are started and, in frame 17, the module programs are loaded. Finally, a movie, "main," is started in frame 19. These various movies are promotional movies and leaders that play while the modules are being loaded.

Figure 4A:
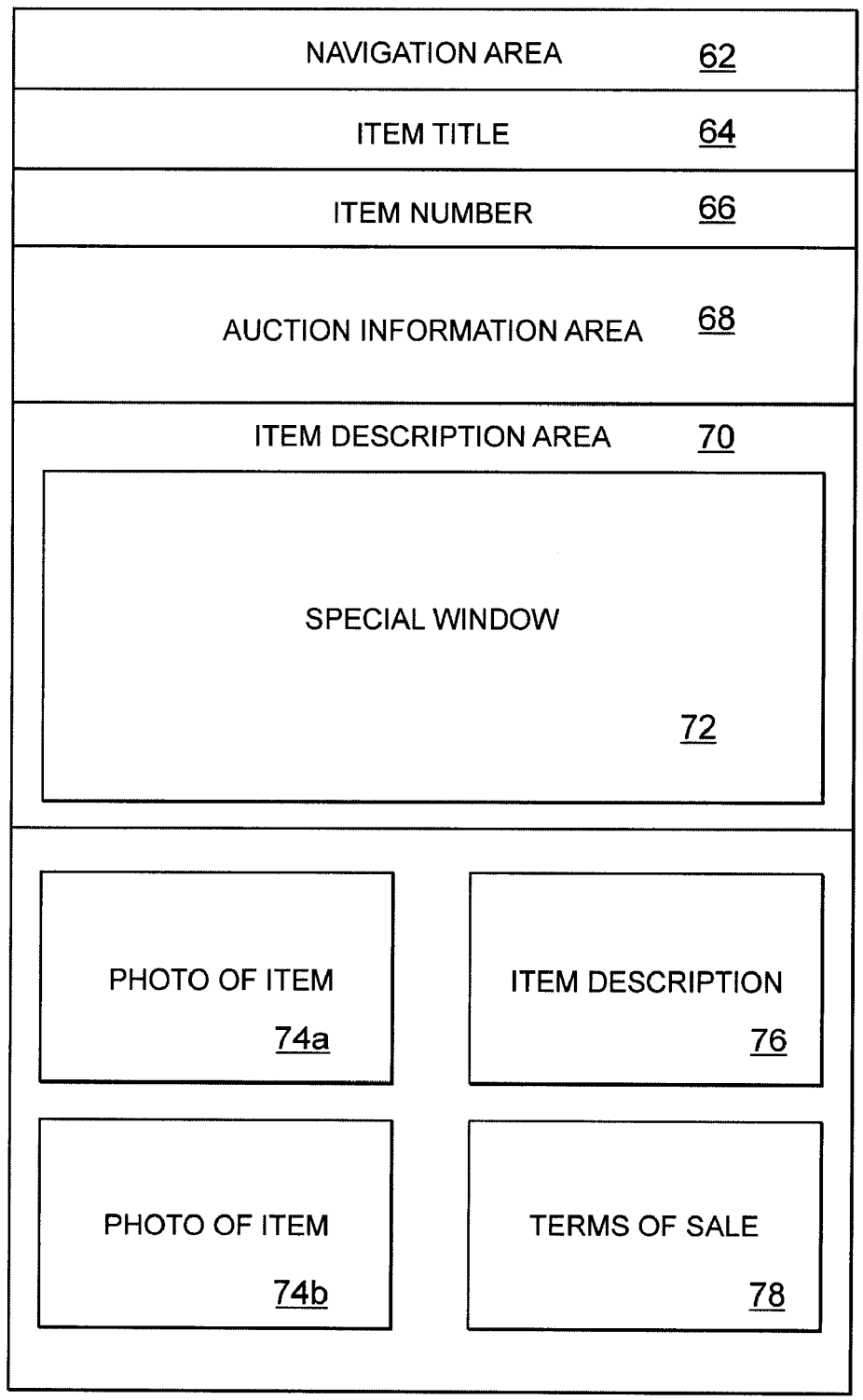
FIG. 4A sets forth a representative item description document resident at the computerized auction system.

FIG. 4A sets forth a representative item description document 60 resident at the computerized auction system. The item description document includes a navigation area 62, an item title 64, an item number 66, an auction information area 68, and an item description area 70. Within the item description area are a special window 72 which is controlled by the present invention, one or more photos of the item 74*a* 74*b*, an item description area 76 and a terms of sale area 78.

Figure 4B:
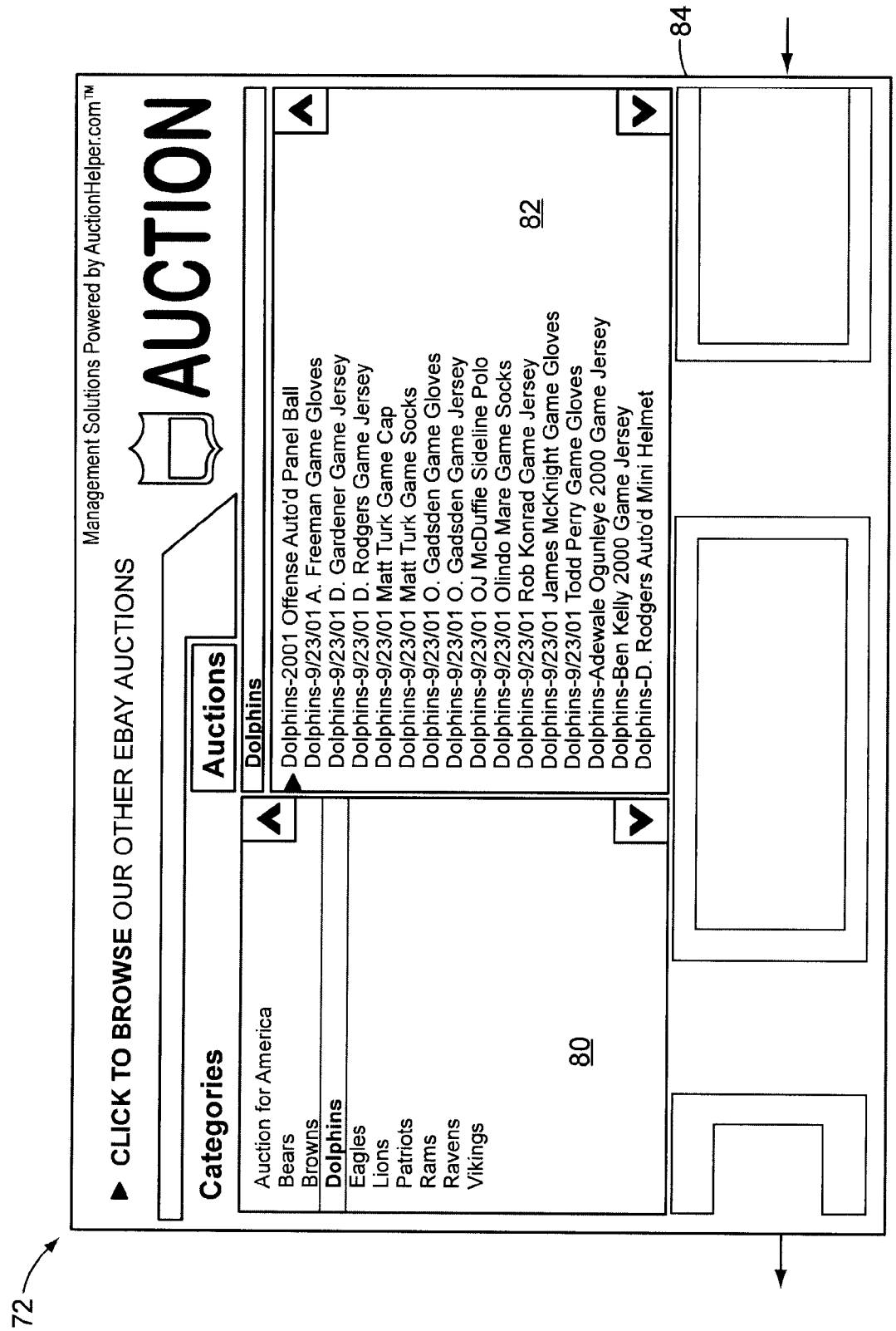
FIG. 4B shows the special window which is controlled by the present invention.

FIG. 4B shows the special window 72 which is controlled by the present invention. There are three panes 80, 82, 84 in the special window. A first pane 80 is used to display seller-related categories with the current category highlighted. A second pane 82 is used to display auction items for the highlighted category. A third pane 84 is used to display pictures of items listed by a particular seller in an area that is configured to scroll horizontally (or in some versions, vertically). The speed of the horizontal movement is controllable by the position of the pointer device relative to the center of the window. Selection of one of the pictures in the scrolling display takes the user to the item description page on the computerized auction system for the item depicted in the selected picture. The window 72 and each of its panes 80, 82, 84 then re-establish themselves in the selected item description document 60, displaying the current category and current item as highlighted areas and the same set of pictures for scrolling.

Figure 5:
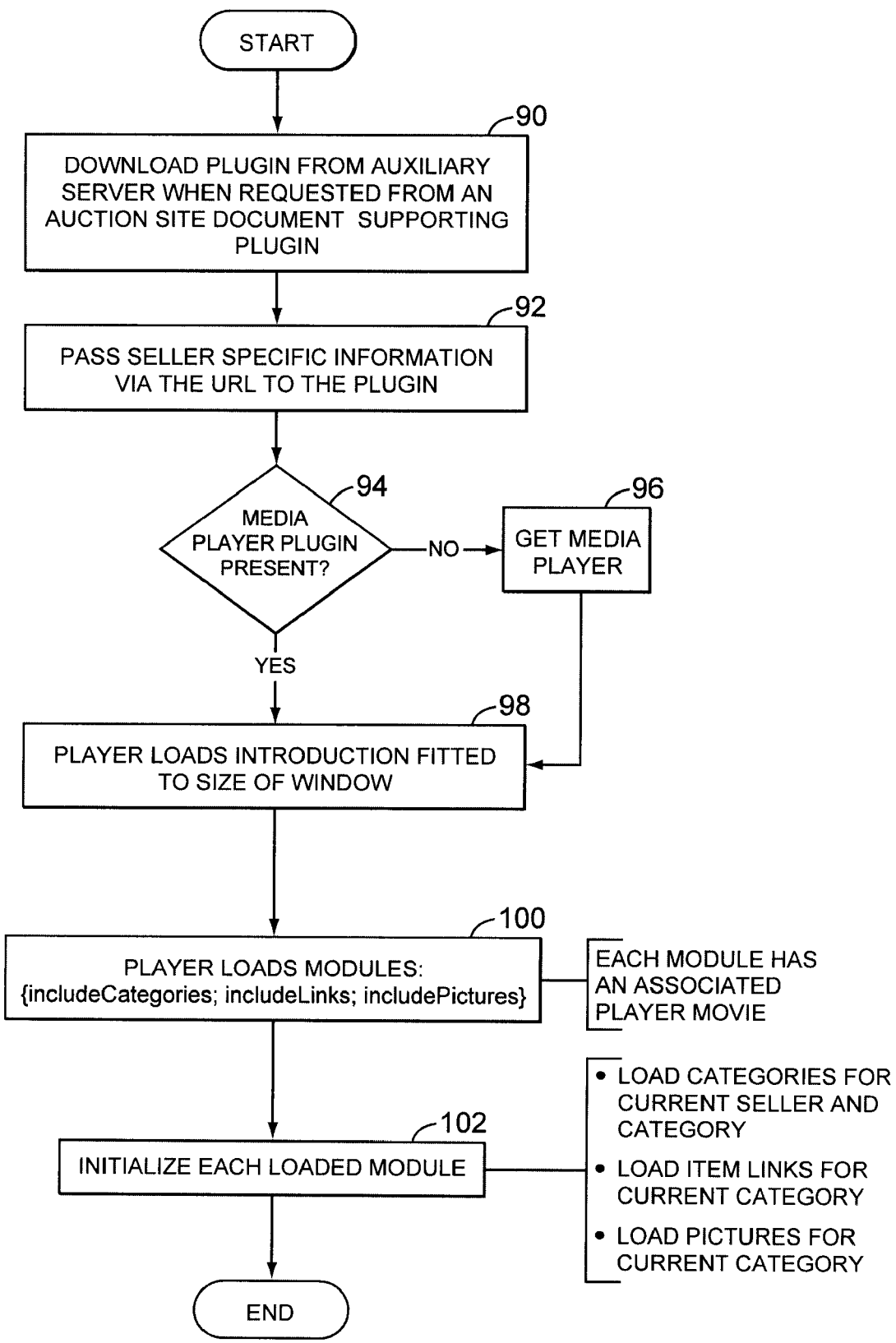
FIG. 5 sets forth a flow chart of the main program of the present invention.

FIG. 5 sets forth a flow chart of steps in the main time line of the present invention. To start the process, the user (a potential bidder), using a client computer system connected to the network, visits the computerized auction system over the network by specifying the url of the computerized auction system to the browser of the client computer system. Upon selecting a search for a particular seller, and visiting an item document presented by the computerized auction system, and upon scrolling in the item description document to the special window, a media player program is downloaded, in step 90, from the auxiliary server to the client computer system browser and seller specific information, e.g., the email address of the seller, is passed, in step 92, to the media player program. A test is performed, in step 94, to determine whether a media player is available to interpret the media player program. If not, as determined in step 94 the user of the client computer system is instructed to obtain the proper media player, in step 96. If the media player is available, as determined in step 94, the media player interprets the downloaded program. The media player program, following a main time line, preferably loads, in step 98, an introduction movie that is sized to fit the size of the special window area within the auction system's item document. While the introduction movie is playing, the media player program loads, in step 100, one or more modules. Modules that can be loaded are the includeCategories module, includeLinks module, and includePictures module. Not all modules need to be loaded. Each of these modules has its own time line, which is independent of the main time line, and each of these modules operates in a specified pane of the special window in the auction system's item description document. After one or more of the media player modules are loaded, the loaded modules are initialized, in step 102. The includeCategories module is initialized with the categories available from the identified seller at the computerized auction system. The includeLinks module is initialized with the items links for the current category and the includePictures module is initialized with the picture urls that relate to items in the current category or the current seller.

As described above, each module operates independently of the main time line and operates within a specified pane of the special window in the auction system's item document.

Figure 6:
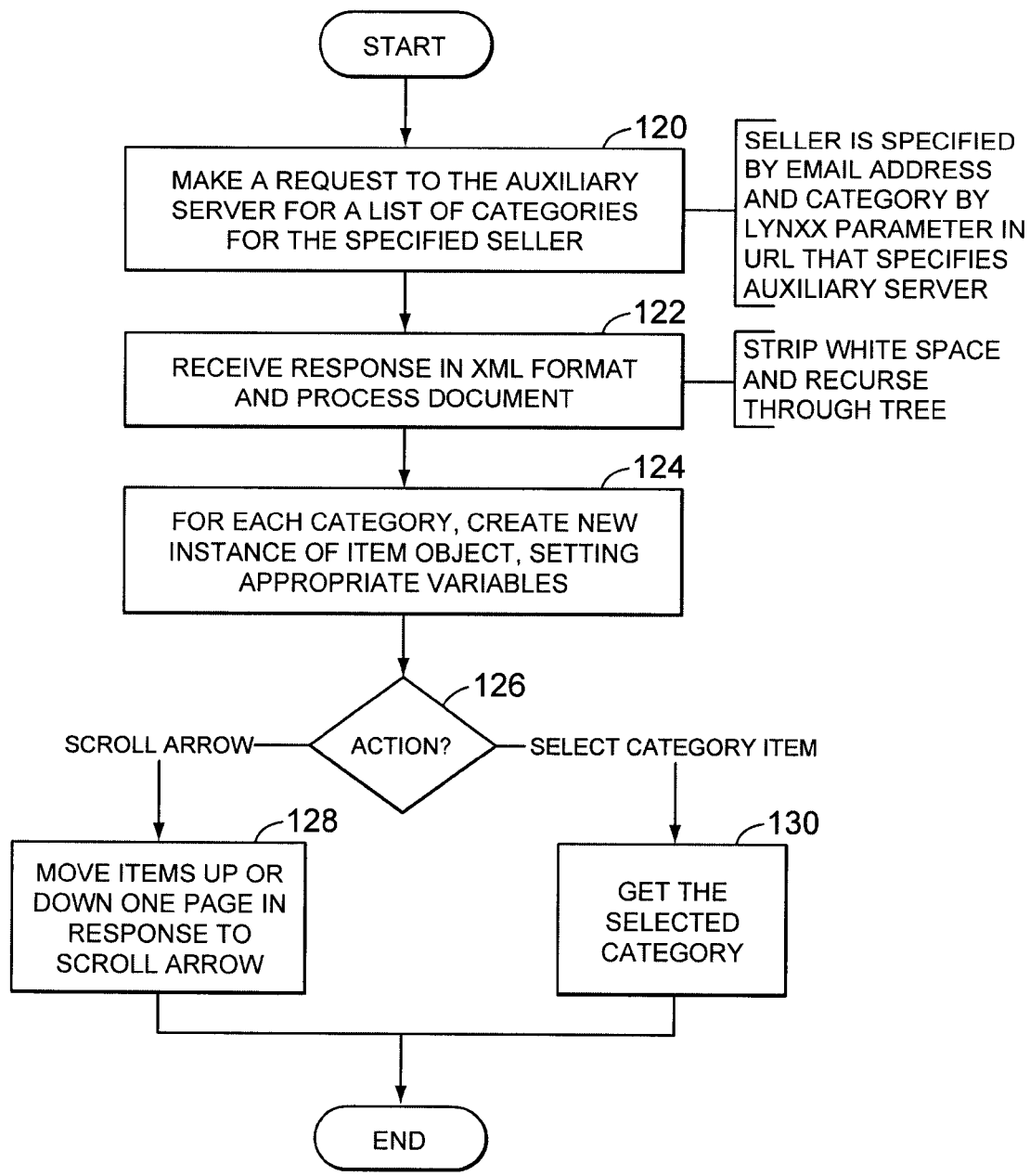
FIG. 6 sets forth the steps in the operation of the includeCategories module.

The includeCategories program has the task of maintaining a current list of categories of items for auction by a specified seller on the auction system. FIG. 6 sets forth the steps in the operation of the includeCategories module. When a seller, different from the current seller, is selected, the includeCategories module makes a request, in step 120, to the auxiliary server for a list of categories for the selected seller. The auxiliary server is specified by an URL that includes, within its text, an email address identifying the seller, and a category parameter. The includeCategories program receives a response, in step 122, a document in XML format preferably, which it processes. For each category in the list, a new object is created, in step 124, that is managed by the module. If the user operates a scroll arrow, as determined in step 126, the items in the category list move up or down, in step 128, depending on whether the arrow is an up or down arrow. If the user selects a category, as determined in step 126, the items in the selected category are obtained, in step 130, and displayed in item list pane of the special window and the selected category is highlighted.

Figure 7:
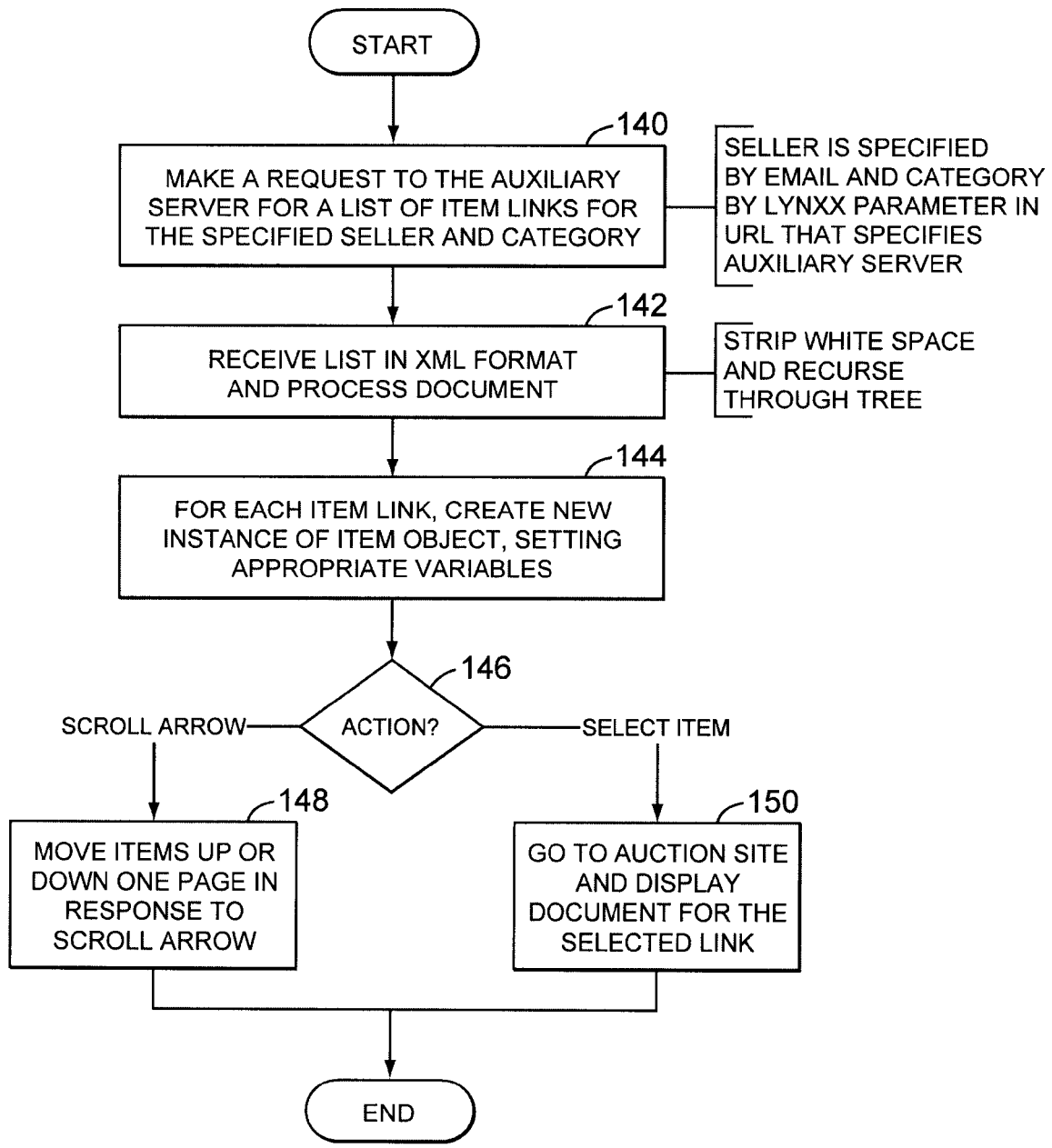
FIG. 7 sets forth the steps in the operation of the includeLinks module.

The includeLinks program has the task of maintaining a list of item links for the currently selected category. FIG. 7 sets forth the steps in the operation of the includeLinks module. Whenever a category or seller, different from the current category or seller, is selected, the includeLinks program makes a request, in step 140, to the auxiliary server for a list of item names and item links for a specified seller and category. The auxiliary server is specified in an URL that includes an email address identifying the seller and a category parameter. The includeLinks program receives, in step 142, the list in an XML format document, preferably, and processes the XML document. For each new item link in the list, the program creates an object, in step 144, which it manages in the pane of the window dedicated to displaying the item names for each item link. When the user uses the scroll arrow in the pane, as determined in step 146, the items in the list move up or down, in step 148, depending on which scroll arrow is activated. When an item is selected, as determined in step 146, the computerized auction system is accessed, in step 150, and the item description document is located on the auction system and displayed as a new document on the user's client computer system. The panes for the category list and item list are re-established in the selected item description document from the auction system, and the lists are redisplayed and updated to highlight the current item and category.

Figure 8:
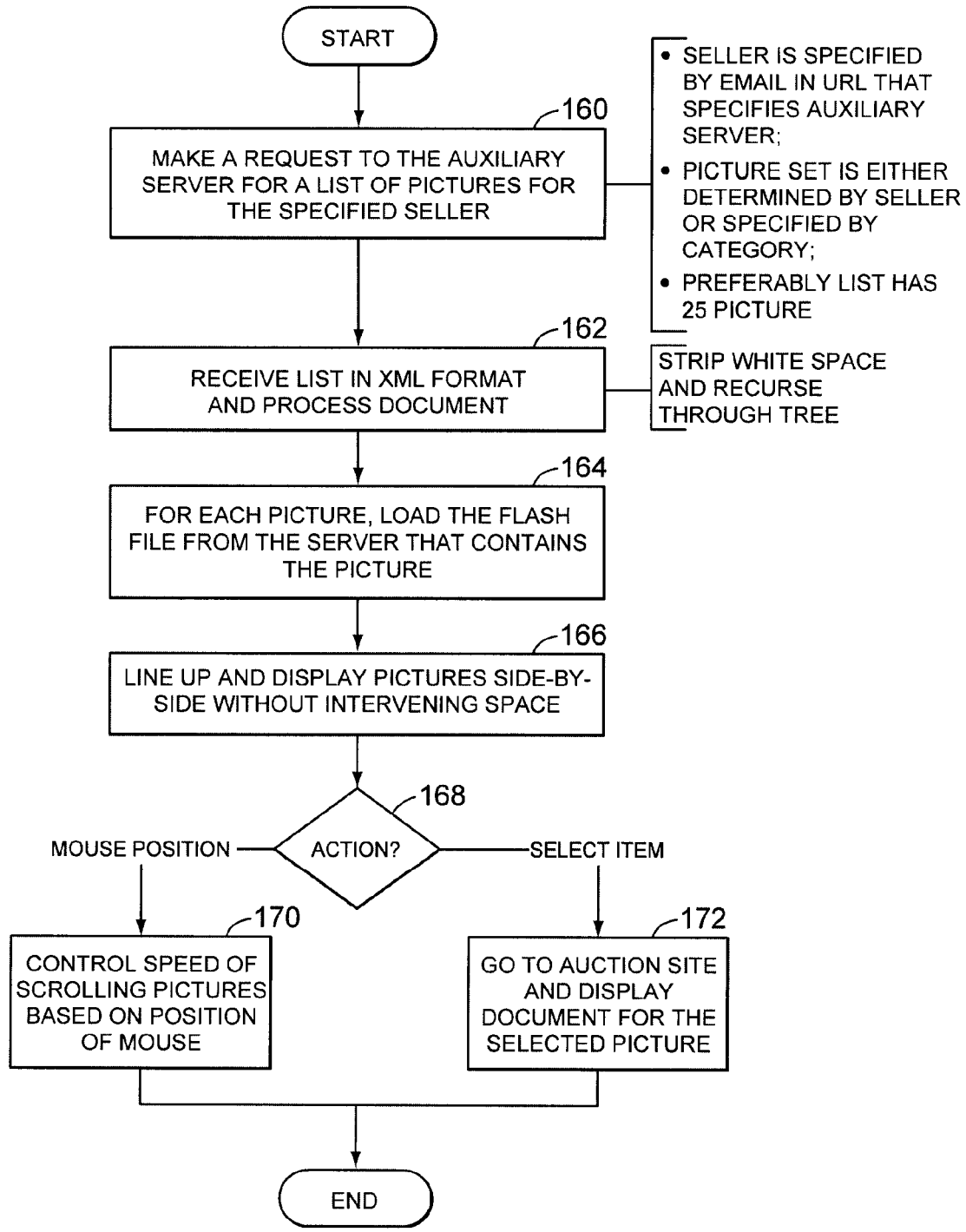
FIG. 8 sets forth the steps in the operation of the includePictures module.

FIG. 8 sets forth the steps in the operation of the includePictures module. For a particular seller, in one alternative, or for a particular seller and category in another alternative, a list of picture urls, in step 160, is obtained from the auxiliary server. The auxiliary server is specified in an URL that includes an email address identifying the seller, and a category parameter specifying the category if needed. A list of pictures, in the form of sets of picture url and item number pairs, is returned, in step 162, by the auxiliary server, preferably in an XML document, which is processed by the module. For each picture url, the media player Picture File for that picture is located on the network and loaded into an array, in step 164, maintained by the module. The module, after receiving a predetermined number of Picture Files, such as Flash movie files, containing pictures of items according to the seller or seller and category, then lines up and displays, in step 166, the pictures, each a separate movie clip, in a horizontal scrolling motion from right to left across the user's display. A pane that is configured for vertical scrolling is also contemplated.

In one embodiment, the seller specifies a certain set of pictures to be shown, and a random selection of 25 pictures is taken from the set. In another embodiment, the seller has specified a set of pictures from a certain category be shown, and a random selection of 25 pictures is taken from this set. This embodiment requires that not only the seller id information, i.e., the seller's email address, but seller category information, be added to the request (the URL) to obtain the pictures from a server connected to the network. If either random selection has fewer than 25 pictures, then additional pictures are selected at random from pictures associated with the seller or seller and category so that 25 pictures are selected.

Preferably, the pictures are displayed, in step 166, side-by-side without spaces. Two types of actions can be taken, as determined in step 168, once the pictures are displayed. The speed of the scrolling of the pictures can be affected and a picture can be selected. The position of the user's pointing device from the center of the scrolling portion of the display determines the scrolling speed. Positioning the pointing device, in step 170, farther from the center increases the scrolling speed; closer to the center decreases the scrolling speed; positioning at the center stops the scrolling. Selecting one of the pictures, in step 172, causes the computerized auction system to be accessed and the item description document for the item selected to be displayed in the user's browser. The panes for category list and item list are re-established, the lists are updated, the current category and item selection are highlighted and the previously obtained picture set is displayed in the pane configured for scrolling.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method of delivering, in the form of selectable images, a plurality of auction items of a selected seller to a browser of a client computer system, comprising:
   receiving, at an auxiliary server, a request from a client browser for a main program in response to the client browser obtaining an item document of a particular seller from an auction site and the browser displaying a particular portion of said item document; and
   delivering the main program to the requesting client browser, the main program being configured to receive, from the client browser, information to select the particular seller, and to load and activate one or more modules including a picture displaying module for displaying selectable images, the picture displaying module being configured to obtain a set of selectable images of the selected seller's auction items based on the received information that selects the particular seller, to moveably display in the item document on the client browser, a set of selectable images, showing the selected seller's auction items, and to receive a user selection of a selectable image being displayed and to redirect the client browser to an auction item document at an auction site associated with the selected image; and
   sending the set of selectable images, based on the received information that selects the particular seller, to the browser.

2. A method of delivering, in the form of selectable images, a plurality of auction items of a selected seller to a client browser as recited in claim 1, wherein the step of receiving a request from a client browser for a main program includes receiving the request from an auction item document obtained from an auction site.

3. A method of delivering, in the form of selectable images, a plurality of auction items of a selected seller to a client browser as recited in claim 1,
   wherein the picture displaying module is configured to moveably display the set of selectable images at a controllable speed; and
   wherein the controllable speed is controlled by a current position of a pointing device connected to the client computer system.

4. A method of delivering, in the form of selectable images, a plurality of auction items of a selected seller to a client browser as recited in claim 1, wherein the client computer system includes a display output device and the client browser occupies a graphical window on display output device; and wherein the picture displaying module is configured to moveably display the set of selectable images horizontally in the client browser graphical window.

5. A method of delivering, in the form of selectable images, a plurality of auction items of a selected seller to a client browser as recited in claim 1, wherein the main program is configured to load and activate a categories module that maintains a set of categories available on the auction site from the specified seller, said categories module initially obtaining the set of categories of the specified seller from the auction site and thereafter obtaining the set of categories from the auxiliary server.

6. A method of delivering, in the form of selectable images, a plurality of auction items of a selected seller to a client browser as recited in claim 5, wherein the set of categories available on the auction site from the specified seller is stored on the auxiliary server.

7. A method of delivering, in the form of selectable images, a plurality of auction items of a selected seller to a client browser as recited in claim 5, wherein the main program is configured to load and activate an item links module that maintains a set of item links for each category in the set of categories available on the auction site from the specified seller.

8. A method of delivering, in the form of selectable images, a plurality of auction items of a selected seller to a client browser as recited in claim 7, wherein the set of item links available on the auction site from the specified seller is stored on the auxiliary server.

9. A method of delivering, in the form of selectable images, a plurality of auction items of a selected seller to a client browser as recited in claim 8, wherein the set of item links includes an item name associated with each item link.

\* \* \* \* \*